United States Patent

Grant

[15] 3,639,184

[45] *Feb. 1, 1972

[54] METHOD FOR PREPARING GELLED SLURRY EXPLOSIVE COMPOSITION CONTAINING DISTINCT LIUQID AND SOLID PHASES

[72] Inventor: Charles H. Grant, Midland, Mich.

[73] Assignee: The Dow Chemical Company, Midland, Mich.

[ * ] Notice: The portion of the term of this patent subsequent to Oct. 28, 1986, has been disclaimed.

[22] Filed: Aug. 19, 1969

[21] Appl. No.: 851,491

Related U.S. Application Data

[63] Continuation-in-part of Ser. No. 705,523, Feb. 14, 1968, Pat. No. 3,475,238.

[52] U.S. Cl............................149/44, 149/60, 149/61, 149/74, 149/76, 149/83, 149/85, 149/109

[51] Int. Cl.............................C06b 19/04, C06b 1/100

[58] Field of Search.................149/44, 60, 61, 74, 76, 83, 149/85

[56] References Cited

UNITED STATES PATENTS 3,475,238  10/1969  Grant.......................................149/109

*Primary Examiner*—Leland A. Sebastian
*Attorney*—Griswold & Burdick, Bruce Kanuch and William R. Norris

[57] ABSTRACT

A method is provided for preparing gelled slurry explosive compositions characterized as containing separate liquid and particulate phases intimately mixed together. The liquid phase containing a gelling agent is prepared and the gelling agent is cross-linked. This provides a component having extended periods of stability. Prior to the intended use of the explosive the cross-linked gum is broken down, the solid particulate constituents are dispersed in the liquid phase and the gelling agent is recross-linked.

7 Claims, No Drawings

3,639,184

METHOD FOR PREPARING GELLED SLURRY EXPLOSIVE COMPOSITION CONTAINING DISTINCT LIUQID AND SOLID PHASES

CROSS-REFERENCE TO RELATED APPLICATION

This is a continuation-in-part of application, Ser. No. 705,523, filed Feb. 14, 1968 by Charles H. Grant, now U.S. Pat. No. 3,475,238.

BACKGROUND

Slurry explosive compositions usually comprise separate particulate and liquid phases intimately mixed together. To assure that the particulate phase is evenly distributed throughout the liquid phase various gelling and thickening agents are also usually employed in amounts sufficient to maintain the solids suspended and to provide other favorable characteristics, e.g., water resistance and the like. Any of a variety of water resistant natural gums and synthetic gelling agents are employed. These gelling agents are adequate if the compositions are to be employed within a relatively short period of time after their preparation, usually within 5 to 8 days. However, the gelling agents, e.g., guar, karaya, polyacrylamides, etc., and mixtures thereof, tend to overcross-link with time. The compositions deteriorate impairing their effectiveness as an explosive.

The present invention overcomes the disadvantages associated with these slurry compositions by a novel method of preparing slurry explosive compositions.

SUMMARY

The present invention concerns a method of preparing gelled slurry explosive compositions characterized as containing separate liquid and particulate phases including a gelling agent. The method comprises preparing the liquid phase of the composition, which may contain some particulate material; introducing a gelling agent into the liquid phase; cross-linking the gelling agent; breaking down the cross-linked gelling agent and adding the requisite particulate constituents to the liquid phase within a short time period prior to the use of the explosive and if desired recross-linking the gelling agents prior to employing the explosive composition.

PREFERRED EMBODIMENTS

In the practice of the present method, a slurry explosive composition, containing at least one particulate inorganic oxidizing salt, a sensitizer and/or fuel which may also be in particulate form and a fluid phase is prepared in the following manner. The initial fluid phase is prepared in a manner known in to the art. For example, a specific quantity of an inorganic oxidizing salt is dissolved in water, alone or in the presence of other fluid constituents such as, for example, petrolic liquids, organic liquid extenders and the like. In accordance with the present invention, a gelling agent is then intimately mixed with the fluid phase and allowed to swell and/or cross-link. The indicated gelled solutions can be stored for considerable lengths of time without deterioration since the solution contains substantially no particulate materials natural-type can be effected by changes in temperature and the like. Prior to the intended use of the slurry explosive, the gelling agent in the solution is broken down, i.e., uncross-linked, either mechanically or chemically, and the required quantity of solid particulate constituents such as, for example, inorganic oxidizing salts, metal fuels and the like are admixed therewith in the required amounts to provide an explosive composition. The gelling agent can then be quickly recross-linked by the addition of a suitable cross-linking agent such as small amounts of an alkaline material, e.g., an ammonical solution saturated with ammonium nitrate for natural-type gums, polyvalent ions, etc.

The novel method of the present invention may be used for preparing slurry explosive compositions which are well known in the art and which contain a gelling agent. These slurries usually contain as essential constituents an inorganic oxidizing salt, a sensitizer and/or fuel, and water.

Examples of inorganic oxidizing salts include ammonium, alkali metal and alkaline earth metal nitrates, perchlorates, sulfates and the like. Specific examples of commonly employed salts are ammonium nitrate, ammonium perchlorate, sodium nitrate, sodium perchlorate, potassium nitrate, potassium perchlorate, magnesium nitrate, magnesium perchlorate, calcium nitrate, other like salts and mixtures thereof. Usually the explosive compositions contain from about 10 percent to about 90 percent by weight of the inorganic salts.

Examples of suitable sensitizers and fuels include "self-explosives," explosives such as TNT, smokeless powder, PETN, RDX, pentolite and other nitrated high explosives; metallic sensitizers and fuels such as, for example, particulate aluminum, magnesium, silicon, iron, ferro-silicon, ferrophosphorus, magnesium-aluminum alloys and the like, and nonexplosive carbonaceous materials, such as finely divided carbon, corn starch, sugar, petrolic liquids such as crude oil and liquid hydrocarbons derived therefrom, formamide, glycols, urea, and the like. The carbonaceous materials are usually employed in an amount up to about 20 percent by weight of the explosive compositions. Metallic sensitizers usually range in size from about 4 mesh to about 200 mesh although finer size particles can also be employed, and are usually employed in amounts up to about 50 percent and more by weight of the explosive composition. Various combinations of sensitizers can also be employed such as, for example, metallic fuels and fuel oils are commonly used together and self-explosives such as, for example, smokeless powder and metallic fuels are employed in the same explosive composition. Other sensitizers include sulfur and sodium nitrate. The latter, when employed in specific proportions, sensitizes the compositions as well as acts as an oxidizer.

Examples of thickening and gelling agents include tree exudates such as gum arabic, ghatti, karaya and tragacanth; seaweed colloids such as agar, Irish moss, carrageenin, and the alginates, exocellular heteropolysaccharides made by fermenting starch-derived sugars; seed extracts such as locust bean, locust kernel, guar and quince seed gums; starches and modified starches such as dextrins, hydroxyethyl starch and British gums; water dispersible derivatives of cellulose such as methyl cellulose, carboxymethylcellulose, sodium cellulose sulfate, methyl hydroxyethyl cellulose and sodium sulfoethyl cellulose. In addition to the foregoing water-soluble natural and derivative polysaccharides, gelatin, casein; polyvinyl alcohol; polyacrylamides of high-molecular weight and modified polyacrylamides, e.g., partially hydrolyzed polyacrylamides, copolymers of acrylamide and acrylic acid, polyacrylic acid, polyvinylpyrrolidone; high-molecular weight polyethylene oxides as well as mixtures of the aforementioned thickening and gelling agents can be used. Polyacrylamides employed herein can have a molecular weight ranging from 1 micron to about 25 microns. Of course, such agents should be selected so that they are compatible with the explosive system employed. Of these, galactomannans and particularly guar gums are preferred because of their ready availability, their stability and general compatibility with slurry explosives of the inorganic oxidizing type. However, the synthetic polymers and mixtures thereof with the natural occuring polymers are presently finding wide acceptance.

Suitable means for cross-linking and breaking down cross-linked gums are known in the art. For example, cross-linking agents include polyvalent ions including, chromate, borate, ferric ions and the like. The cross-linked gelling agents may be broken down by chemical changes, e.g., pH change, or by mechanical kneading of the gelled solutions.

When natural gums, e.g., guar, are employed in the invention they may be cross-linked by adjusting the pH of the solution to neutral or basic range. To break the cross-linked gum to solution the solution is made acidic by the addition of a mineral acid, e.g., nitric acid. The gum is then recross-linked by the addition of a basic producing material such as ammonia solutions, e.g., divers liquid and the like. Another means for cross-linking, for example, galactomannans are taught in U.S. Pat. No. 3,355,336, specifically at column 2, line 44 to column 3, line 22, said disclosure being incorporated herein by reference. Methylcellulose thickeners, e.g., hydroxy propyl, methylcellulose and the like can be cross-linked by the addition of solutions containing polyvalent ions, e.g., dichromate ions. The cross-linked methylcellulose can then be softened by acidifying the cross-linked solution. Another means of practicing the present invention comprises employing polyacrylamide as a thickening agent. The polyacrylamide in the solution is cross-linked by the addition of ferric ions. The cross-linked system can then be uncross-linked by converting the ferric ions to ferrous ions.

The amount of gum and cross-linking agent employed will depend on the physical characteristics desired in the slurry explosive. For example, when a pumpable explosive composition is desired, from about 0.5 to 1.5 percent by weight of a thickening agent can be used. When guar gum, for example, is employed as the gelling agent, about 2.5 percent, based on the weight of the gum in the explosive, of a 5 percent sodium dichromate solution is employed as a satisfactory cross-linking agent.

The method of the present invention may be specifically employed to prepare the explosive compositions defined in U.S. Pat. Nos. 2,992,912; 3,091,559; 3,094,443; and 3,287,189.

An example of a particularly useful slurry explosive composition which may be prepared by the method of the present invention is disclosed in U.S. Pat. No. 3,308,896, issued Mar. 7, 1967 to Grant. The explosive composition disclosed by Grant consists of ammonium nitrate from 0 percent to about 85 percent; alkali metal nitrate from 0 percent to about 60 percent; particulate aluminum from about 5 percent to about 40 percent; water from about 5 percent to 25 percent, and a gelling agent from about 0.2 percent to about 2.5 percent. A preferred gelled explosive composition is disclosed consisting of sodium nitrate from about 5 percent to about 40 percent; ammonium nitrate from about 15 percent to about 85 percent; particulate aluminum from about 10 percent to about 30 percent; water from about 6 percent to about 16 percent; liquid water-miscible liquid extends from about 2 percent to about 16 percent; and a water swellable hydrophobic, cross-linkable gum from about 0.5 percent to about 1.5 percent, and cross-linking agent.

The particulate aluminum employed in the explosive composition usually ranges from about 4 mesh to about 150-mesh U.S. Standard Sieve and has a gauge (thickness) of from about 0.25 mil to about 30 mils. Preferably a substantial proportion of the aluminum has a gauge up to about 5 mils.

"Aluminum" is defined in the Patent as aluminum and aluminum alloys containing at least about 60 percent by weight aluminum.

Liquid organic fluid extenders which ordinarily are employed in the composition defined in the Patent and other explosive slurries are those having a favorable carbon-oxygen ratio such that there is no detrimental competition of the carbon with the metal for available oxygen in the system. Monohydroxy alkanols containing from one to about four carbon atoms, ethylene and diethylene glycol, propylene glycol, glycerol and formamide are used as extenders or diluents in explosive compositions. Ordinarily, formamide, which has a low-carbon content and relatively high-boiling point is utilized as the liquid extender.

The composition as defined in U.S. Pat. No. 3,307,986 may be prepared by the present invention, for example, by dispersing a natural gum, e.g., guar gum, in an ammonium nitrate-formamide solution to which is added water. This solution has been found to gel, i.e., the gum will cross-link, within a relatively short time usually less than 5 days. By adjusting the pH of the gelled solution to range from about 3 to about 6.5 the gum may be uncross-linked. After the cross-linked gum is broken down the solution can then be employed to disperse the particulate solid inorganic salts and metal and then recross-linked, for example, by the addition of Divers liquid.

The following examples will facilitate a more complete understanding of the present invention but are not meant to limit it thereto.

EXAMPLE 1

To illustrate the effect of pH on the cross-linking time of a liquid phase of an explosive composition the following tests were run. A basic liquid phase, in paste form, was prepared containing the following constituents as parts by weight:

| | |
|---|---|
| Formamide | 10.00 |
| Ammonium Nitrate (Prills) | 5.00 |
| Guar Gum | 0.8 |
| $H_2O$ (and acid total) | 11.00 |

The pH of various samples of the solution was adjusted by the substitution of aqueous nitric acid (about 5 molar) for a portion of the water. The time in days for the solution to gel (observed as not flowable) was observed and the results are tabulated in the following table I.

TABLE I

| Sample No. | Initial pH | Days to Gel |
|---|---|---|
| 1 | 6.66 (no acid) | 3 |
| 2 | 6.4 | 6 |
| 3 | 6.1 | 12 |
| 4 | 4.3 | 23 |
| 5 | 3.6 | 33 |

EXAMPLE 2

Another paste was prepared which contained the following constituents as parts by weight:

| | |
|---|---|
| Formamide | 10.00 |
| Ammonium Nitrate (Prills) | 5.00 |
| Guar Gum | 0.80 |
| Water (and acid total) | 11.00 |
| Sodium Nitrate (Prills) | 10.00 |

The pH of various samples of the solution was adjusted by the substitution of aqueous nitric acid (about 5 molar) for a portion of the water. The time, in days, for the solution to gel was observed and the results tabulated in following table II.

TABLE II

| Sample No. | Initial pH | Days to Gel |
|---|---|---|
| 1 | 6.8 (no acid) | 3 |
| 2 | 4.6 | 7 |
| 3 | 4.2 | 7 |
| 4 | 3.6 | 13 |
| 5 | 3.2 | 23 |

Both of the examples illustrate that cross-linking of guar and other natural gums can be controlled by changing the pH of the gelled solution. The cross-linking of other solutions employed in the preparation of slurry explosive compositions and containing a gum such as karaya, guar and karaya mixtures and synthetic polymers such as polyacrylamides and the like can be controlled in a similar manner, or by the use of specific cross-linking agents, e.g., borates, chromates, etc.

What is claimed is:

1. A method for preparing gelled slurry explosive compositions containing distinct liquid and particulate phases and a gelling agent which comprises:

a. preparing the liquid phase and including therein a gelling agent;
b. cross-linking the gelling agent to provide a gelled solution;
c. prior to the use of the explosive composition breaking down the cross-linked gelling agent;
d. dispersing the particulate phase into the liquid phase; and
e. recross-linking the gelling agent to provide a gelled slurry explosive composition.

2. The method as defined in claim 1 wherein the liquid phase comprises water and an organic liquid extender.

3. The method as defined in claim 1 wherein the gelling agent comprises a polysaccharide.

4. The method as defined in claim 1 wherein the gelling agent comprises at least one synthetic polymer.

5. The method as defined in claim 1 wherein said liquid phase comprises an aqueous solution substantially saturated with at least one inorganic oxidizing salt.

6. The method as defined in claim 5 wherein said liquid phase comprises in addition an organic liquid extender.

7. The method as defined in claim 1 wherein said particulate phase comprises particulate inorganic oxidizing salts and particulate metal.

* * * * *

PO-1050
(5/69)

UNITED STATES PATENT OFFICE
CERTIFICATE OF CORRECTION

Patent No. 3,639,184      Dated    1 February 1972

Inventor(s)    Charles H. Grant

It is certified that error appears in the above-identified patent and that said Letters Patent are hereby corrected as shown below:

1st page of patent, change title to read: --METHOD FOR PREPARING GELLED SLURRY EXPLOSIVE COMPOSITIONS CONTAINING DISTINCT LIQUID AND SOLID PHASES--.

Column 1, change the title to read: --METHOD FOR PREPARING GELLED SLURRY EXPLOSIVE COMPOSITIONS CONTAINING DISTINCT LIQUID AND SOLID PHASES--

Column 1, line 59, delete "natural-type" and insert --which--.

Column 3, line 28, change the patent number to --3,307,896-- line 41, delete "extends" and insert --extenders--.

line 56, delete "-tion" and insert --tio--.

Signed and sealed this 8th day of August 1972.

(SEAL)
Attest:

EDWARD M. FLETCHER, JR.      ROBERT GOTTSCHALK
Attesting Officer      Commissioner of Patents